May 31, 1927.
E. P. BARTHOLOMAY
1,630,323
CONNECTER AND SUPPORT FOR METERS
Filed June 5, 1926
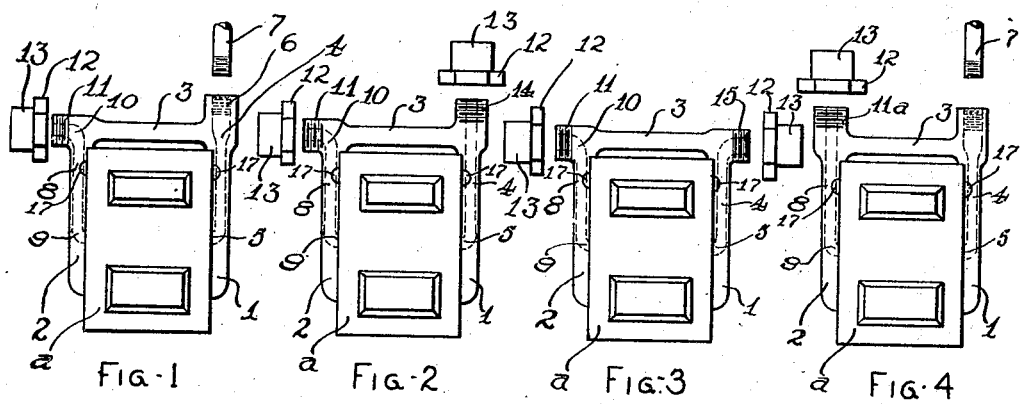
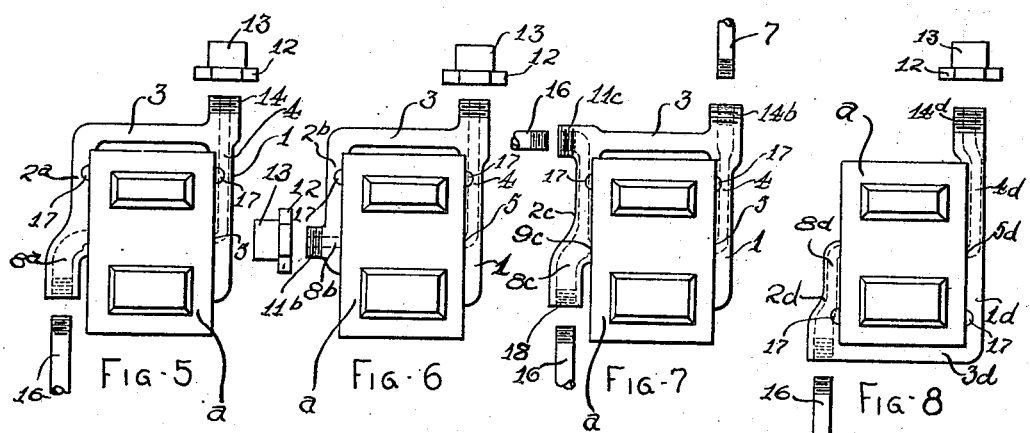
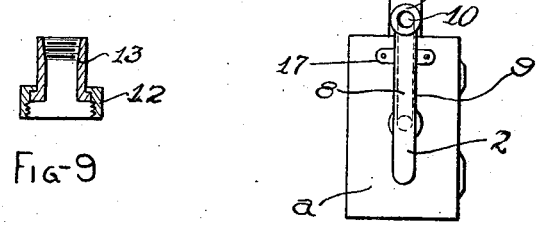
INVENTOR
Edward P. Bartholomay
BY
his ATTORNEYS Patented May 31, 1927.

1,630,323

UNITED STATES PATENT OFFICE.

EDWARD P. BARTHOLOMAY, OF ROCHESTER, NEW YORK.

CONNECTER AND SUPPORT FOR METERS.

Application filed June 5, 1926. Serial No. 114,007.

The present invention relates to connecters and supports for meters, and an object of the invention is to provide a construction which is inexpensive to manufacture, and strong and durable in use. Another object of the invention is to provide a construction in which the meter support and the intake and outlet connections of the meter are embodied in a single, rigid structure, so that blows on or vibrations in the meter will not be transmitted to the inlet and outlet connections in such a manner that fracture of the joints between these connections and the meter will take place. A still further object of the invention is to provide a construction which will permit the inlet and outlet connection as well as the meter support to be embodied in a single casting.

To these and other ends, the invention consists of certain parts and combinations of parts, all of which will be hereinafter described; the novel features being pointed out in the appended claims.

In the drawings:

Figs. 1 to 8, inclusive, show eight different modifications of the invention in elevation;

Fig. 9 is a sectional view through one of the coupling members usually employed in meters of this type; and Fig. 10 shows the embodiment illustrated in Fig. 1 in side elevation.

In all embodiments of the invention $a$ indicates the meter which usually has intake and exhaust openings in opposite walls thereof.

In the embodiment of the invention shown in Figs. 1 and 10, there is employed a casting having two vertical arms 1 and 2 and a horizontal connecting arm 3 adjacent the upper ends of the vertical arm. The vertical arm 1 has a vertical passageway 4 formed therein, the lower end of this passageway bending laterally at 5 and connecting with the intake of the meter $a$. The upper end is enlarged and internally threaded at 6 for reception of the intake pipe 7. The other arm 2 of this casting is provided with a vertical passageway 8 bending laterally at its lower end at 9 to connect with the outlet of the meter and bending laterally at its upper end at 10 through a projecting portion 11 which is externally threaded for engagement with the internally threaded collar 12 turning on the pipe connection 13 for the outlet pipe.

In the embodiment of the invention shown in Fig. 2, the parts are the same, except that the inlet portion of the vertical arm 1 is externally threaded at 14 for engagement by the rotary collar 12 of the coupling member 13 which connects with the inlet pipe.

In the embodiment shown in Fig. 3, the parts are the same as those shown in Fig. 1, except that the inlet arm 1 has a laterally turned and externally threaded portion 15 at its upper end in horizontal alignment with the laterally turned and externally threaded portion 11 on the outlet arm 2, both the laterally turned portions 11 and 15 being aligned with the connecting portion 3.

In the embodiment of the invention shown in Fig. 4, the parts are the same as those shown in Fig. 1, except that the outlet arm 2 has an upward extension $11^a$ which is externally threaded for engagement with the collar 12.

In the embodiment of the invention shown in Fig. 5, the inlet arm 1 is formed like the embodiment shown in Fig. 2, while the outlet arm $2^a$ has its outlet passage $8^a$ extending downwardly to the lower end of the arm where it is internally threaded for engagement with the outlet piping 16.

The embodiment of the invention shown in Fig. 6 is also like the embodiment shown in Fig. 2, except that the arm $2^b$ has a horizontal passage $8^b$ in line with the outlet of the meter casing and extending through an externally threaded projection $11^b$ with which outlet coupling 12, 13 may be engaged.

In the embodiment of the invention illustrated in Fig. 7 the inlet arm 1 has an extension $14^b$ which is both internally and externally threaded, adapting either the inlet pipe 7 for connection therewith through the internal threads, or the coupling device 12, 13 therewith through the external threading. The outlet arm $2^c$ has its lower end extended below the lateral connection $9^c$, the passage $8^c$ leading through said extension, and the interior walls of the extension being externally threaded at 18 for engagement by the outlet piping 16. The passage $8^c$ also extends upwardly in the arm $2^c$ to and through a laterally extending portion $11^c$ which is both internally and externally threaded so that either the outlet piping 16 may be connected thereto through the internal threads or the coupling 12, 13 may be connected thereto through the external threading.

In the embodiment of the invention shown in Fig. 8, the two arms 1$^d$ and 2$^d$ are connected through a connecting portion 3$^d$, arranged, below the meter $a$, the two arms extending upwardly from the connecting portion. The arm 1$^d$ has a passageway 4$^d$ therein which through a laterally turned portion 5$^d$ connects with the inlet of the meter, the upper end of the passageway extending through a portion 14$^d$ projecting about the meter and, in this instance, externally threaded for connection with the collar 12. The other arm 2$^d$ has a passage 8$^d$ therein which at its upper end is adapted to turn with the outlet of the meter and its lower end opens downwardly, the walls being internally threaded for engagement by the external threads on the end of the outlet piping 16.

In all embodiments of the invention a frame is provided which has two arms, one provided with an inlet passageway, and the other provided with an outlet passageway, these two arms being connected by a rigid connecting member which cooperates with one end of the meter and, at the same time, holds the two arms in rigid relation with each other. Each of the arms also has a means adjacent the end of the passageway wherein through which an inlet piping or an outlet piping may be connected to the arm. This means may be through the provision of an extension which is either externally or internally threaded, or both. The connecting arm may either engage the upper part of the meter casing or the lower part. In one instance, one of the arms has two passages, permitting the connecting therewith of a piping coming from either one or two directions. The outlet and inlet passages are formed in arms which are preferably soldered throughout their lengths at opposite sides of the meter and are connected by a rigid portion engaging another side of the meter, thus firmly securing the meter in position, and, at the same time, providing rigid connection between the arms. Ears 17 may also be projected from opposite sides of each of the vertical arms to bolt the arms to the opposite sides of the meter casing $a$.

What I claim as my invention and desire to secure by Letters Patent is:

1. The combination with a gas meter casing having inlet and outlet openings in its opposite side walls, of a combined support and connection comprising two upright arms fitting against and secured to the exterior of the side walls of the meter and extending along the same and having passages communicating with the inlet and outlet openings in the said side walls of the meter, a connecting member formed integral with the said arms and extending across the meter, and means on the ends of the arms for connecting the inlet of the meter with the supply pipe and the outlet with a service pipe.

2. The combination with a gas meter casing having inlet and outlet openings in its opposite side walls, of a combined support and connection comprising two upright arms fitting against and secured to the exterior of the side walls of the meter and extending along the same and having passages communicating with the inlet and outlet openings in the said side walls of the meter, a connecting member extending across the top of the meter and formed integral with and connecting the upper ends of the arms, and means on the upper ends of the arms for connecting the inlet of the meter with the supply pipe and the outlet with the service pipe.

EDWARD P. BARTHOLOMAY.